(No Model.) 2 Sheets—Sheet 2.
C. KLINIK, F. PINKOWSKI & A. GROSS.
SAFETY DEVICE FOR ELEVATORS.
No. 384,319. Patented June 12, 1888.
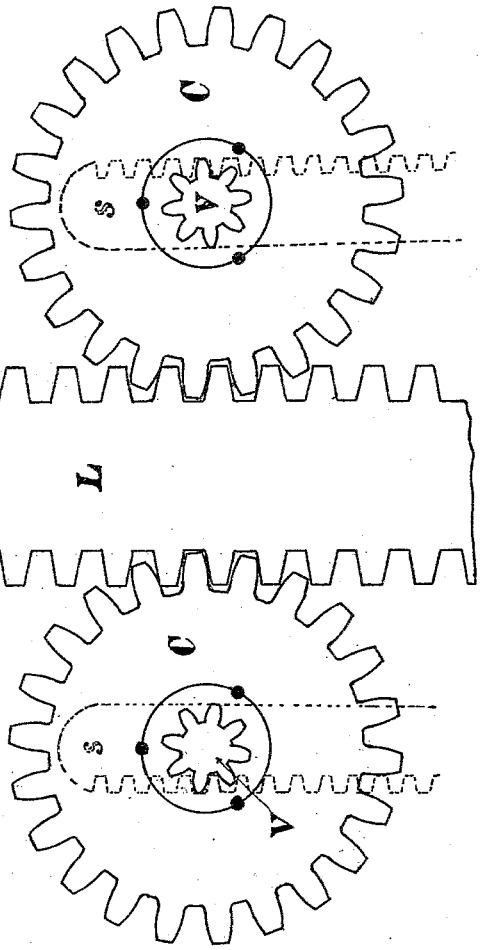
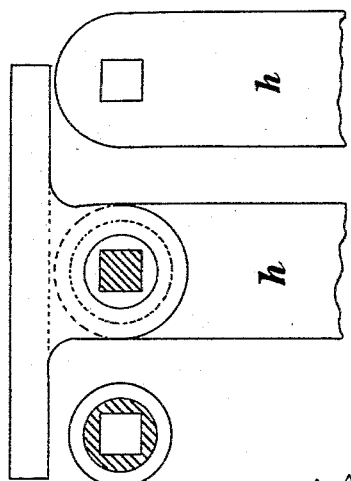
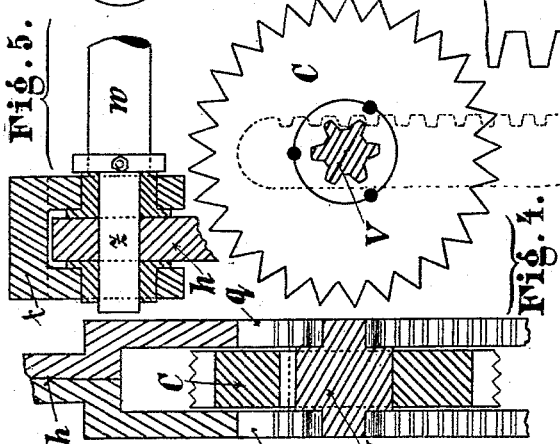
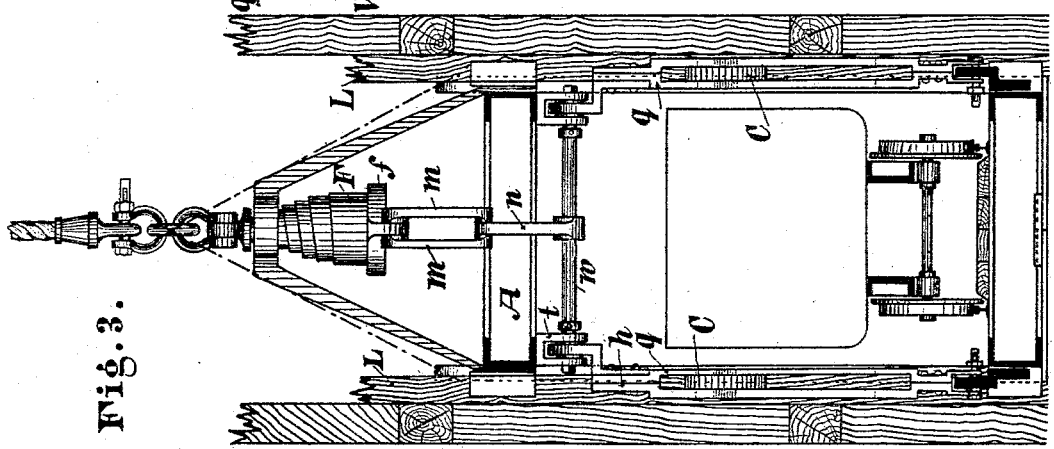
Witnesses:
Alfred Jonghmans
William Partington.
Inventors:
C. Klinik
F. Pinkowski
A. Gross, per
Roeder & Briesen atty

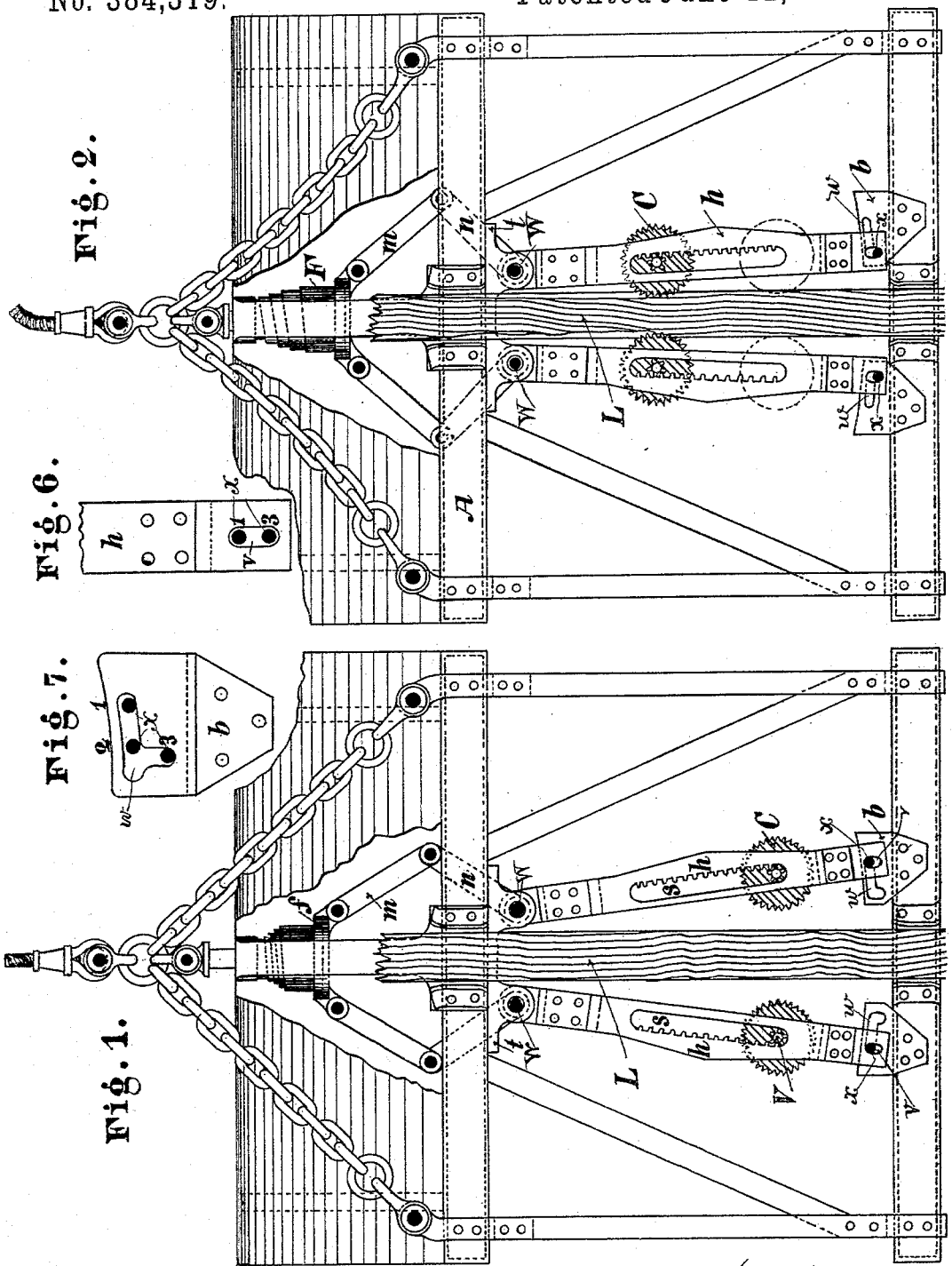

UNITED STATES PATENT OFFICE.

CONSTANTIN KLINIK AND FRIEDRICH PINKOWSKI, OF KÖNIGSHÜTTE, AND AUGUST GROSS, OF BEUTHEN, PRUSSIA, GERMANY.

SAFETY DEVICE FOR ELEVATORS.

SPECIFICATION forming part of Letters Patent No. 384,319, dated June 12, 1888.

Application filed January 31, 1888. Serial No. 262,520. (No model.)

*To all whom it may concern:*

Be it known that we, CONSTANTIN KLINIK and FRIEDRICH PINKOWSKI, both residing at Königshütte, Germany, and AUGUST GROSS, residing at Beuthen, Germany, all subjects of the King of Prussia, German Empire, have invented certain new and useful Improvements in Safety-Clutches for Elevator-Cages, of which the following is a specification.

This invention relates to an improved safety-clutch for elevator-cages; and the invention consists in the various features of improvement more fully pointed out in the claim.

In the accompanying drawings, Figure 1 is a side view of an elevator-cage, showing our improved clutch out of action. Fig. 2 is a similar view showing the clutch in action. Fig. 3 is a vertical transverse section, partly in side view of the same. Figs. 4 to 8 are details of the different parts of the clutch.

The clutch-arms $h$ consist each of two symmetric parts, Figs. 3, 4, and 5. The upper ends of said arms are mounted on square journals of the shafts W, carried in bearings provided in brackets $t$, secured to the upper frame, A. On the center of the shafts W levers $n$ are mounted, connected by link-rods $m$ to the transverse plate $f$ of the spring F, to which the suspension-rope is secured. When the cage is weighted, the spring will be stretched as long as the cable is unbroken. The arms $h$ will then remain in the position shown in Fig. 1, at a distance from the beam or guide-bar L. As soon as the cable breaks the spring F will contract, the joint and lever-arms $m$ $n$ will be forced down, and the shafts W turned so as to force the lower ends of the arms $h$ toward each other.

The two parts or sides of the arms $h$ have longitudinal slots $s$, one side of said slots being toothed. With each of the racks thus formed a pinion, V, is in gear, said pinion being mounted on the axis of a toothed wheel, C, arranged between the two sides of the arms $h$. It will be obvious that when the cable breaks the said toothed wheels C will be forced against the guide-beam L of the shaft, and as the angle formed by the arms $h$ and the said beam is now more acute the wheels will catch into the wood. The stoppage, however, will not be sudden, but while the cage is moving for some distance down, the wheels C will move upward in the slotted arms $h$ from the position shown in Fig. 1 to that shown in Fig. 2, after which a complete stoppage will be obtained.

The lower ends of the slotted arms $h$ are made with a slot, $v$, through which a pin, $x$, passes, (see Fig. 6,) said pin passing likewise through slots $w$ made in guides $b$, Fig. 7, attached to the lower part of the frame to guide the lower ends of the arms $h$ and allow the above-described side motion of the same.

In shafts with iron guides for the cage, instead of wooden beams, the said guide-bar must be toothed and the wheels C be cogged to the same pitch. While with wooden beams the injured parts of the wood must be replaced, such repairs are not necessary when iron-toothed guide-bars are used.

What we claim is—

In a safety-clutch for elevators, the combination of the spring F, the toggle-links $m$ $n$, the slotted arms $h$, the guides $b$, the toothed wheels V, provided with pinions adapted to work in the slots in the arms $h$, and the guide-beams L, all substantially as described.

In testimony whereof we hereunto sign our names, in the presence of two subscribing witnesses, this 31st day of October, 1887.

CONSTANTIN KLINIK.
  FRIEDRICH PINKOWSKI.
  AUGUST GROSS.

Witnesses:
 AUGUST LASCHEYK,
 GEORG GROSS.